United States Patent
Chiang et al.

(10) Patent No.: US 8,194,137 B2
(45) Date of Patent: Jun. 5, 2012

(54) IMAGE FRAME TRANSMISSION METHOD FOR DATA OVERRUN CONTROL

(75) Inventors: Chin-Yi Chiang, Taipei (TW); Wallace Huang, Taipei (TW)

(73) Assignee: Via Technologies, Inc., Taipei (TW)

( * ) Notice: Subject to any disclaimer, the term of this patent is extended or adjusted under 35 U.S.C. 154(b) by 1207 days.

(21) Appl. No.: 11/049,371

(22) Filed: Feb. 2, 2005

(65) Prior Publication Data

US 2005/0190271 A1 Sep. 1, 2005

(30) Foreign Application Priority Data

Feb. 2, 2004 (TW) ................................ 93102340 A

(51) Int. Cl.
*H04N 5/225* (2006.01)
(52) U.S. Cl. ................................ 348/207.1; 348/207.2
(58) Field of Classification Search ............... 348/231.6, 348/207.1, 14.12, 222.1, 207.2
See application file for complete search history.

(56) References Cited

U.S. PATENT DOCUMENTS

| | | | | |
|---|---|---|---|---|
| 4,635,116 A | * | 1/1987 | Hirota et al. | 348/714 |
| 5,406,329 A | * | 4/1995 | Kashimura et al. | 348/175 |
| 5,629,948 A | * | 5/1997 | Hagiwara et al. | 714/748 |
| 5,742,582 A | * | 4/1998 | Suzuki | 369/275.1 |
| 5,777,755 A | * | 7/1998 | Aoki et al. | 358/444 |
| 6,081,294 A | * | 6/2000 | Cooper | 348/221.1 |
| 6,249,359 B1 | * | 6/2001 | Aoki et al. | 358/473 |
| 6,747,656 B2 | * | 6/2004 | Matsushita | 345/534 |
| 6,947,085 B1 | * | 9/2005 | Booth, Jr. | 348/302 |
| 6,965,400 B1 | * | 11/2005 | Haba et al. | 348/222.1 |
| 7,483,058 B1 | * | 1/2009 | Frank et al. | 348/222.1 |
| 2001/0040699 A1 | * | 11/2001 | Osawa et al. | 358/1.17 |
| 2004/0263650 A1 | * | 12/2004 | Park et al. | 348/266 |

* cited by examiner

*Primary Examiner* — Usman Khan
(74) *Attorney, Agent, or Firm* — Kirton McConkie; Evan R. Witt

(57) ABSTRACT

An image frame transmission method for use in a network transmission system is provided. The network transmission system includes an image sensor and an image processor. Firstly, a first image data segment of an image frame captured by the image sensor is outputted to the image processor in response to a first state of a control signal after an initial signal has been asserted by the image processor. Then, the output of a second image data segment of the image frame following the first image data segment to the image processor is delayed in response to the transition of the control signal from the first state to a second state. Afterward, the second image data segment is outputted to the image processor in response to the transition of the control signal from the second state to the first second state.

13 Claims, 7 Drawing Sheets

IMAGE FRAME TRANSMISSION METHOD FOR DATA OVERRUN CONTROL

FIELD OF THE INVENTION

The present invention relates to an image frame transmission method, and more particularly to an image frame transmission method for use in a network transmission system.

BACKGROUND OF THE INVENTION

With the increasing development of network technologies, a broad-bandwidth network transmission method is widely used to transmit image data via network. In addition, some network products such as web camera and web digital cameras are widely used for processing digital images.

In a conventional network transmission system as shown in FIG. 1(a), an image frame captured by an image sensor 11 is transmitted to an image processor 12 for image processing. The processed image data are temporarily stored in a buffer memory 13 disposed inside or outside the image processor 12 or directly outputted to a computer 14.

Referring to FIG. 1(b), a timing waveform diagram of the related signals processed in the network transmission system is shown as an example. The overall time period required to process an image frame F is defined as an image frame processing period and includes an exposure period t1, an image data outputting period t2 and an idle period t3. Generally, the image frame processing period is a reciprocal of the maximum number of image frames outputted by the image sensor 11 per second. In response to an initial signal, the image frame F begins to be transmitted to the image processor 12. After the very short exposure period t1, six image data segments D1~D6 consisting the image frame F are sequentially outputted to the image processor 12 within the image data outputting period t2. Meanwhile, these image data segments D1~D6 are outputted to the image processor 12 to be processed within an image data processing period tp0, which is equal to the image data outputting period t2. After the idle period t3, another image frame can be exposed and then outputted from the image sensor 11 to the image processor 12 to be processed in a similar manner.

The image processor 12 is for example a digital signal processor. The image sensor 11 can be a CMOS (complementary metal-oxide semiconductor) image sensor or a CCD (charge-coupled device) image sensor. Conventionally, for achieving real-time data transmission and saving cost, no extra flow control strategy such as FIFO (first in, first out) is given to the image sensor 11. In the case that a previous image frame received from the image sensor 11 has not completed image processing by the image processor 12 while a new image frame is coming, a problem in data overrun may occur. For example, if the second image data D2 is still being processed by the image processor 12, the immediately following third image data D3 entering the image processor 12 may overlay the second image data D2. Such data overrun may lead to a succession of transmission errors occurring in the subsequently received image data D4~D6.

SUMMARY OF THE INVENTION

The present invention is to provide an image frame transmission method for use in a network transmission system for preventing from data overrun.

In accordance with a first aspect of the present invention, there is provided an image frame transmission method for use in a network transmission system. The network transmission system comprises an image sensor and an image processor. Firstly, a first image data segment of an image frame captured by the image sensor is outputted to the image processor in response to a first state of a control signal after an initial signal has been asserted by the image processor. Then, the output of a second image data segment of the image frame following the first image data segment to the image processor is delayed in response to the transition of the control signal from the first state to a second state. Afterward, the second image data segment is outputted to the image processor in response to the transition of the control signal from the second state to the first second state.

In an embodiment, the method further comprises a step of outputting the second image data segment to the image processor immediately after the first image data segment when the control signal is kept in the first state after the first image data segment is outputted.

In an embodiment, the processing period of the image sensor for each image frame is pre-defined with an exposure period, an image data outputting period and an idle period in sequence, the image frame is captured by the image sensor within the exposure period, and the image frame consisting of a plurality of image data segments including the first and second image data segments is completely outputted to the image processor segment by segment within an image data processing period.

In an embodiment, the image data processing period is greater than the image data outputting period.

In an embodiment, the image data processing period is no greater than the sum of the image data outputting period and the idle period.

In an embodiment, the image data processing period is equal to the sum of the image data outputting period and the idle period.

In an embodiment, the plurality of image data segments equally share the image data processing period by periodically toggling the control signal between the first and second states in a certain pattern.

In an embodiment, the plurality of image data segments differentially share the image data processing period by toggling the control signal between the first and second states according to respective conditions of the plurality of image data segments.

In an embodiment, the control signal is asserted by the image processor.

In an embodiment, the first and second states of the control signal are high and low levels.

In an embodiment, the image sensor is operated in a still image mode.

In an embodiment, the image sensor is operated in a dynamic image mode.

In accordance with a second aspect of the present invention, there is provided an image frame transmission method for use in a network transmission system. The network transmission system comprises an image sensor and an image processor. The processing period of the image sensor for an image frame is pre-defined with an exposure period, an image data outputting period and an idle period in sequence. The image frame consists of a plurality of image data segments is completely outputted to the image processor within an image data processing period. The method comprises the following steps. Firstly, an initial signal is asserted for outputting the image frame after the exposure period. Then, a control signal which toggles between first and second states is asserted according to a certain rule. Then, the plurality of image data segments are outputted to the image processor segment by segment in response to the first state of the control signal. Whenever the control signal toggles from the first state to the second state, the output of the plurality of image data segments are paused. Afterward, the output of the plurality of image data segments is restored in response to the transition of the control signal from the second state to the first second state.

In an embodiment, the certain rule is that the control signal periodically toggles between the first and second states so that the plurality of image data segments equally share the image data processing period.

In an embodiment, the image data processing period is greater than the image data outputting period but no greater than the sum of the image data outputting period and the idle period.

In an embodiment, the image data processing period is equal to the sum of the image data outputting period and the idle period.

In an embodiment, the certain rule is that the control signal toggles between the first and second states according to respective conditions of the plurality of image data segments so that the plurality of image data segments differentially share the image data processing period.

In an embodiment, the image data processing period is no greater than the sum of the image data outputting period and the idle period.

The above contents of the present invention will become more readily apparent to those ordinarily skilled in the art after reviewing the following detailed description and accompanying drawings, in which:

DETAILED DESCRIPTION OF THE PREFERRED EMBODIMENT

Figure 1A:
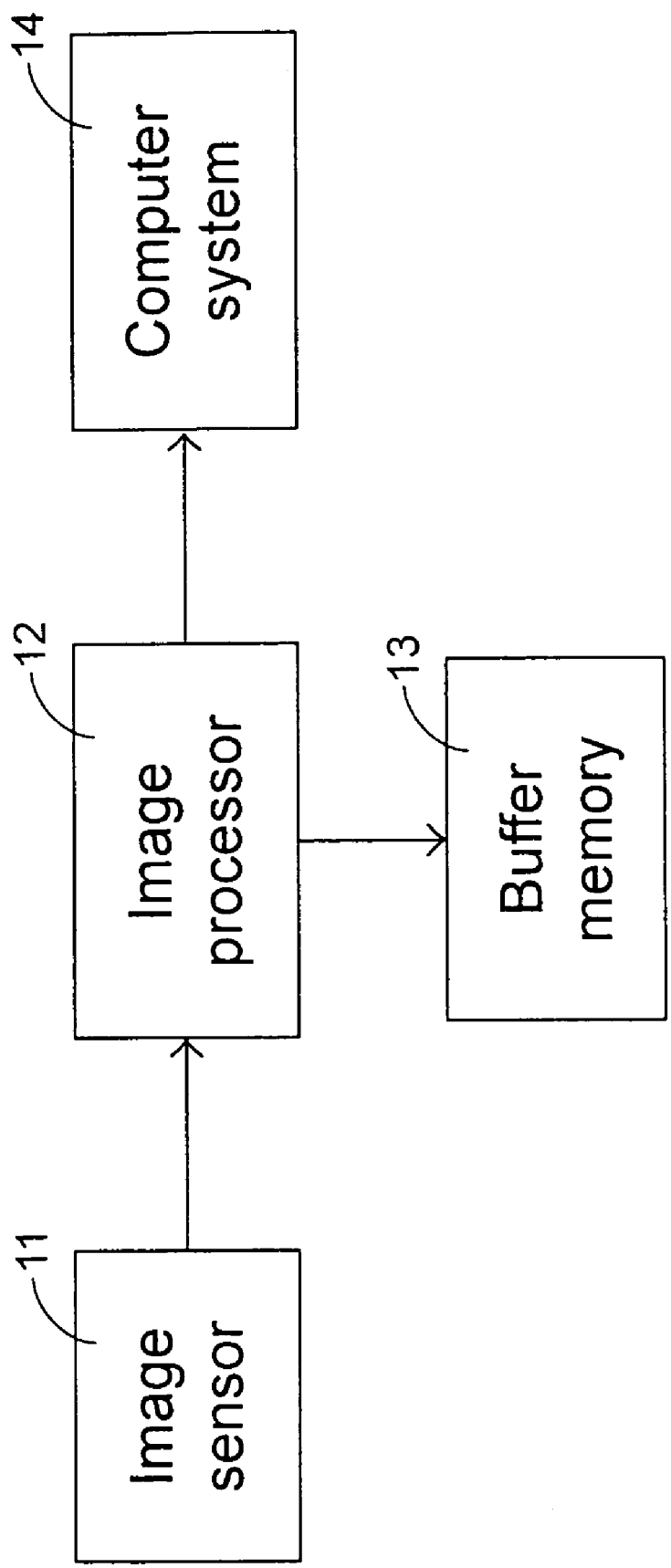
FIG. 1(a) is a functional block diagram of a conventional network transmission system.
Figure 1B:
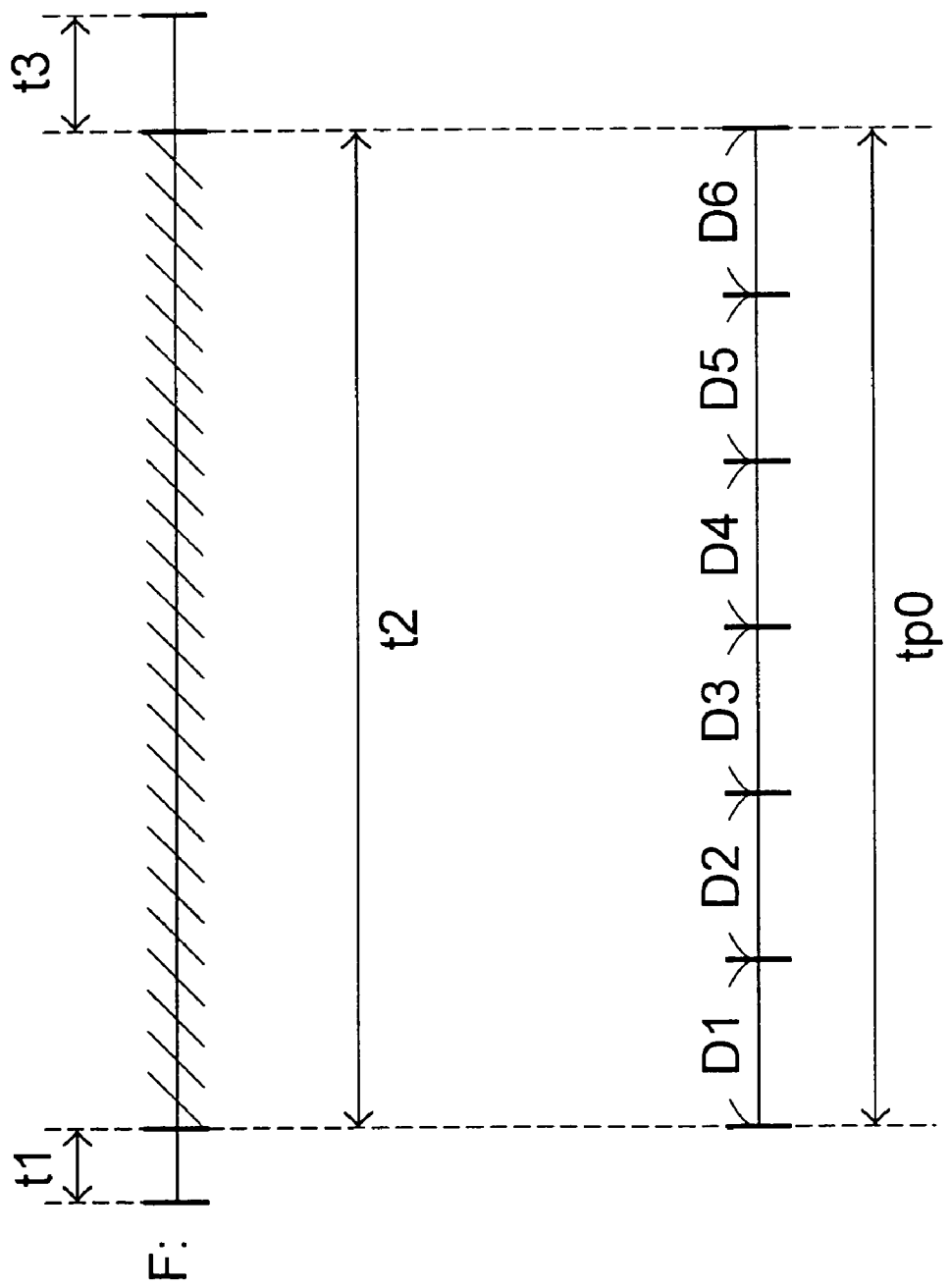
FIG. 1(b) is a timing waveform diagram illustrating the related signals processed in the network transmission system of FIG. 1(a)
Figure 2:
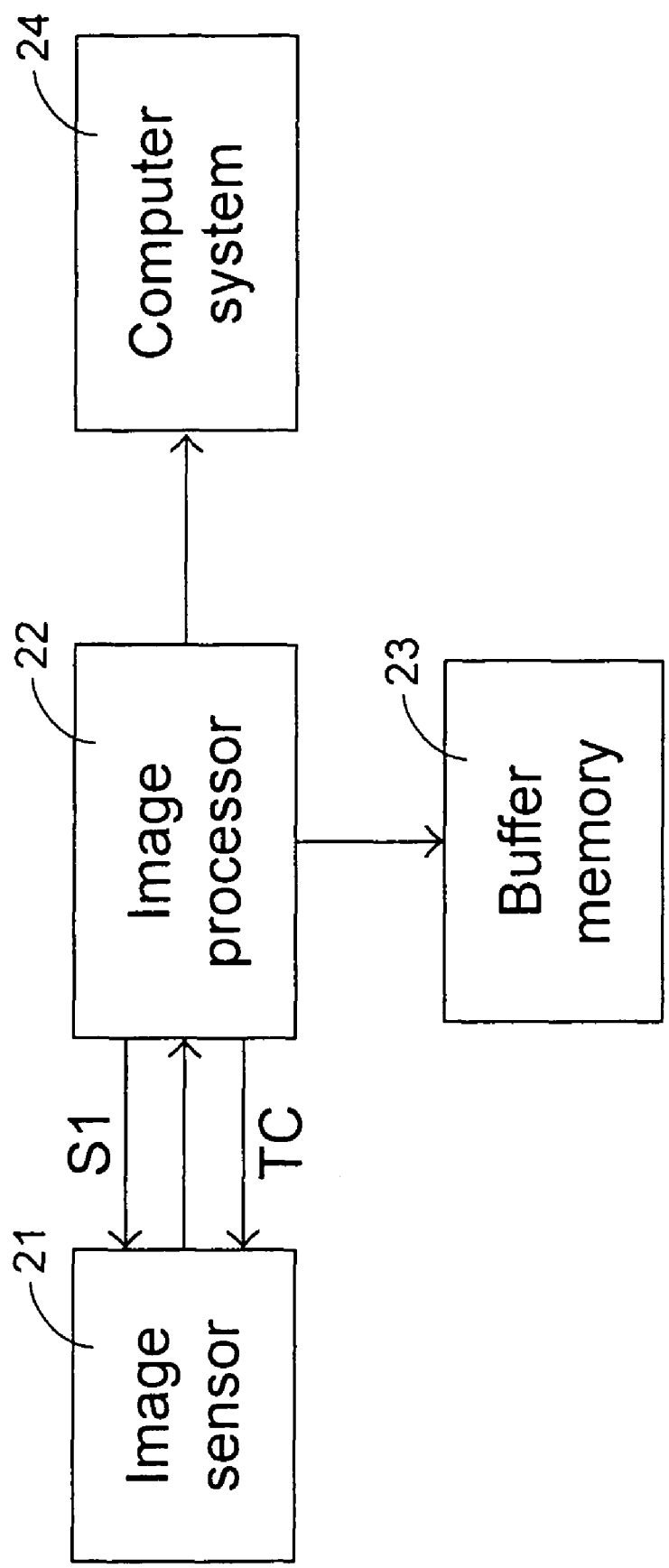
FIG. 2 is a functional block diagram of a network transmission system according to the present invention.
Figure 3:
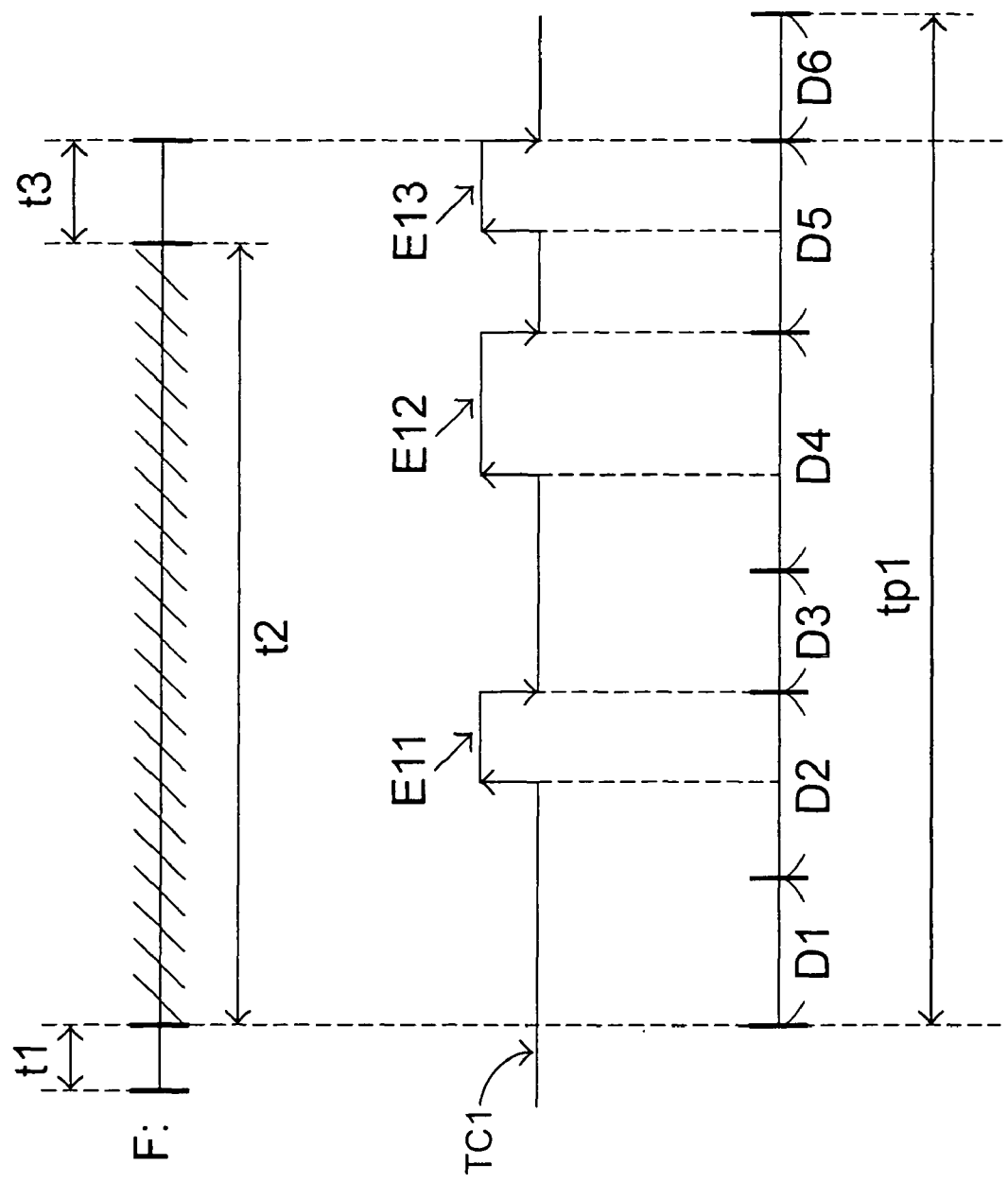
FIG. 3 is a timing waveform diagram illustrating the related signals processed in the network transmission system of FIG. 1(a) according to a first embodiment of the present invention.
Figure 4:
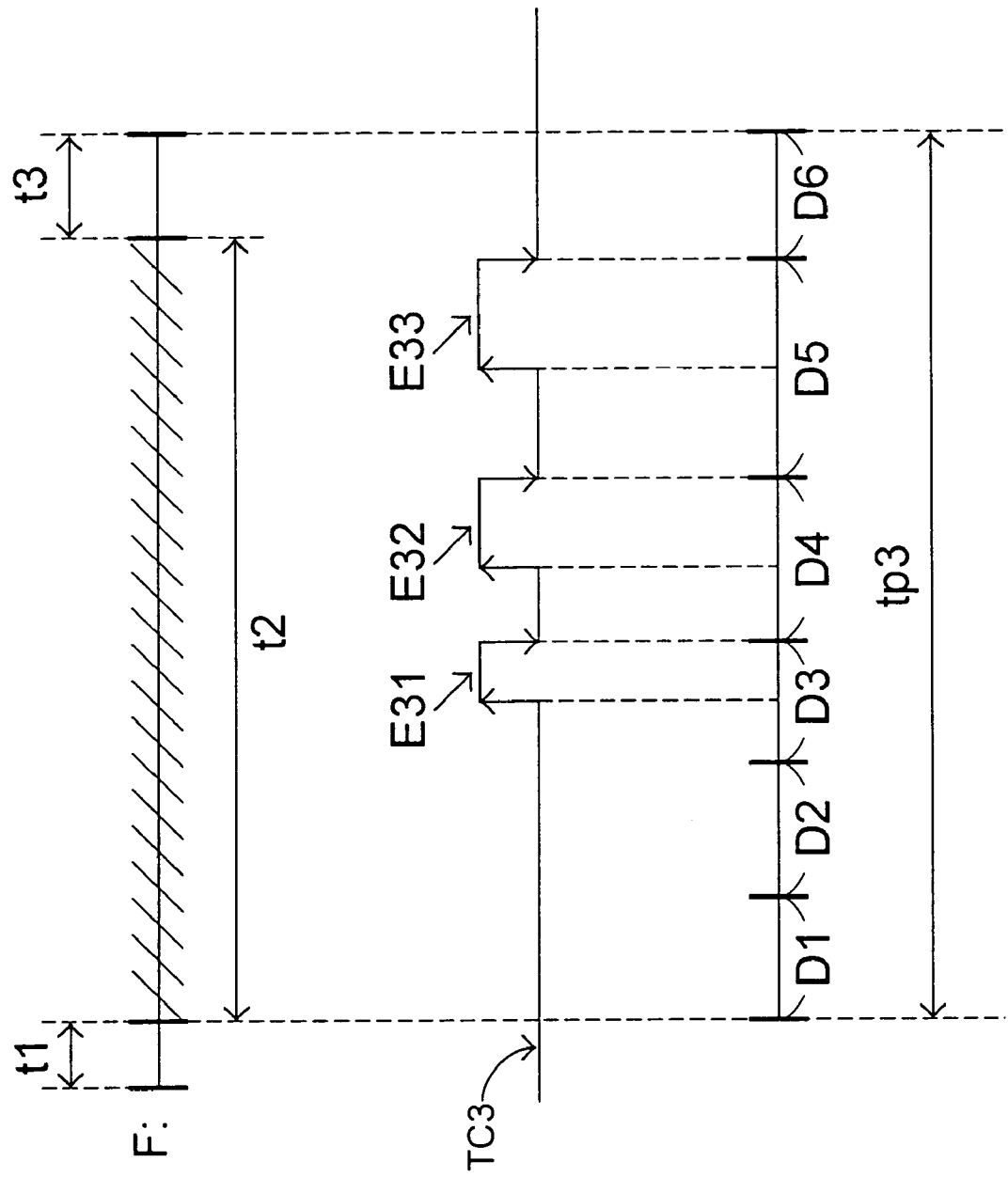
FIG. 4 is a timing waveform diagram illustrating the related signals processed in the network transmission system of FIG. 1(a) according to a second embodiment of the present invention.

FIG. 2 is a functional block diagram illustrating a network transmission system according to the present invention, and the timing waveform diagram of the processed signals is shown in any of FIGS. 3~6. The network transmission system of the present invention principally comprises an image sensor 21, an image processor 22 and a buffer memory 23. An image frame of a physical object captured by an image sensor 21 is transmitted to the image processor 22 for image processing. The processed image data are temporarily stored in the buffer memory 23 disposed inside or outside the image processor 22 or directly outputted to a computer 24. The overall time period required to process an image frame F is defined as an image frame processing period and includes an exposure period t1, an image data outputting period t2 and an idle period t3. The image frame processing period is a reciprocal of the maximum number of image frames outputted by the image sensor 21 per second. In response to an initial signal S1 and a control signal TC, the image frame F obtained by the image sensor 21 is outputted to the image processor 22. After the very short exposure period t1, a plurality of image data segments consisting the image frame F are sequentially outputted to the image processor 22 within the image data outputting period t2. Herein, six image data segments D1~D6 are used to illustrate the present method, as shown in FIG. 3 or 4. These image data segments D1~D6 are outputted to the image processor to be processed one by one.

In a first embodiment of the present invention as shown in FIG. 3, the processing time of the image data segments D1~D6 varies with the practical requirement. For example, image data segments D2, D4 and D5 require longer processing time than the other image data segments D1, D3 and D6 do. Therefore, the image processor 22 asserts a control signal TC1 to the image sensor 21 to reflect the facts. In response to a first state of the control signal TC1, e.g. a low level state in this embodiment, the image data segments D1~D2 are smoothly outputted from the image sensor 21 to the image processor 22 to be processed. Since the image data segment D2 needs more processing time and thus data overrun may occur in he coming image data segment D3, the control signal TC1 toggles from the first state to a second state, e.g. a high level state, to delay next image data segment D3 with a period E11. The output of the image data segment D3 is suspended until the control signal TC1 toggles from the second state back to the first state. Likewise, the image data segments D5 and D6 are also delayed with periods E12 and E13, respectively, in response to the transition of the control signal TC1 from the first state to the second state. Further, the delay periods E11, E12 and E13 vary with respective necessary processing time of the image data segments. This embodiment is particularly adapted to the image frame transmission under a still image mode of the image sensor 21.

When the image sensor 21 is operated in a still image mode, image frames are inputted from the image sensor 21 to the image processor 22 discretely. Therefore, each image frame inputted into the image processor 22 can be processed with elongated time as long as it is completed before next frame is inputted for processing. In other words, if necessary, the image data processing period tp1 can be greater than the sum of the image data outputting period t2 and idle period t3.

Similar to the first embodiment, in a second embodiment of the present invention as shown in FIG. 4, the processing time of the image data segments D1~D6 also varies with the practical requirement in response to the control signal TC3. The image data segments D3, D5 and D6 are delayed with different periods E31, E32 and E33. However, a time limit is additionally applied. That is, the image data processing period tp3 is no greater than, and preferably equal to, the sum of the image data outputting period t2 and idle period t3. This embodiment is particularly adapted to the image frame transmission under a dynamic image mode of the image sensor 21. When the image sensor 21 is operated in a dynamic image mode, image frames are inputted from the image sensor 21 to the image processor 22 continuously. Therefore, each image frame inputted into the image processor 22 should complete processing within the time period distributed thereto. Therefore, the image data processing period tp3 is not allowed to be greater than the sum of the image data outputting period t2 and idle period t3. By having the image data processing period tp3 equal to the sum of the image data outputting period t2 and idle period t3, the idle period t3 is made use of to maximize the processing time and minimize data overrun.

Figure 5:
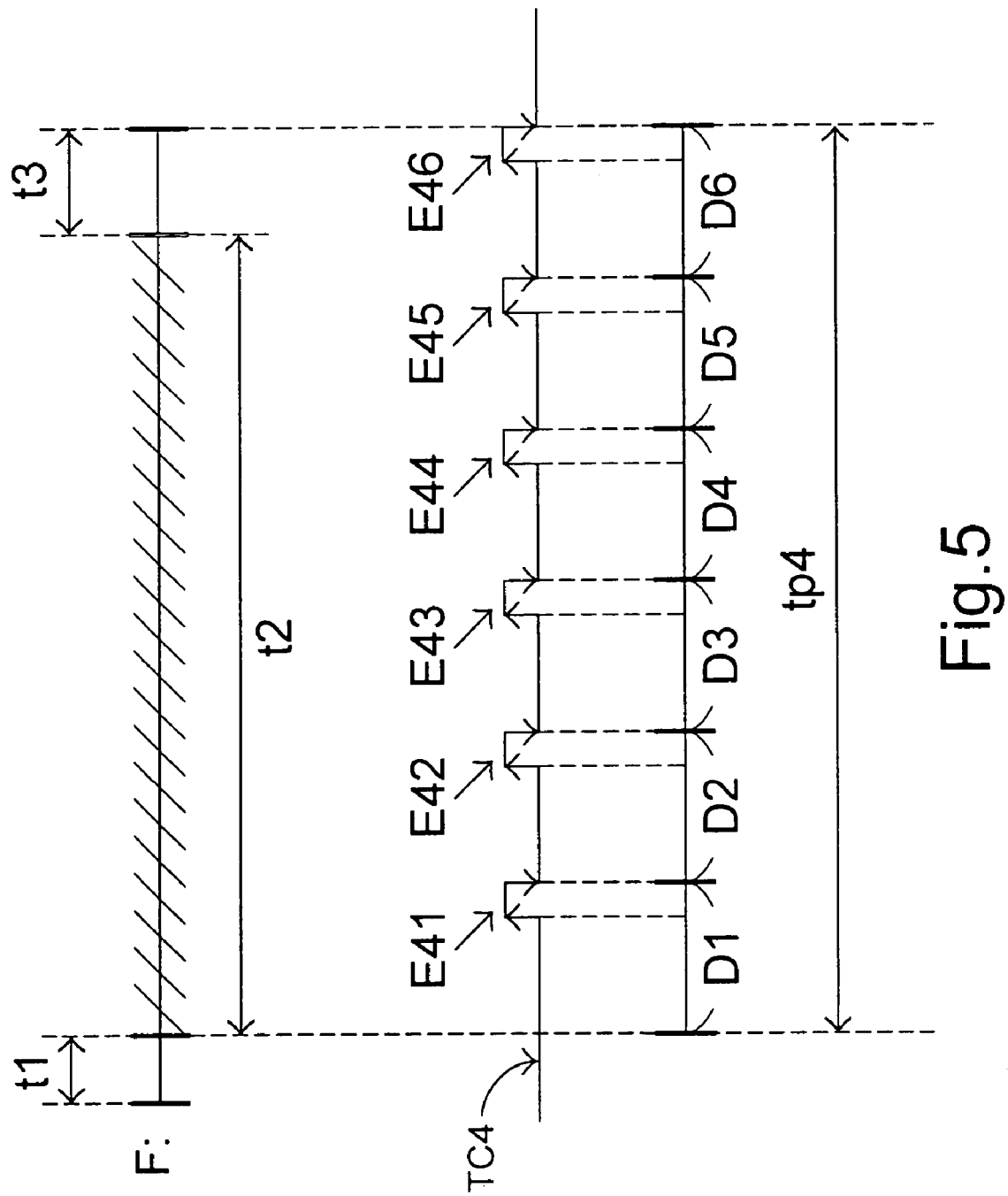
FIG. 5 is a timing waveform diagram illustrating the related signals processed in the network transmission system of FIG. 1(a) according to a third embodiment of the present invention.

In a third embodiment of the present invention, the processing time for each of the image data segments D1~D6 is identical but elongated compared to the prior art. Since no following image frame will be inputted from the image sensor 21 to the image processor 22 during the idle period t3, the idle period t3 can be made use of to elongate the image data processing period tp4 by being equally distributed to all the six image data segments D1~D6 as delay periods E41, E42, E43, E44, E45 and E46 in response to the control signal TC4, as shown in FIG. 5. In this way, the processing time for each image frame can be elongated to a certain extent without affecting the processing of next frame inputted immediately after the processed image frame. Therefore, this embodiment is applicable to both the still image mode and the dynamic image mode.

Figure 6:
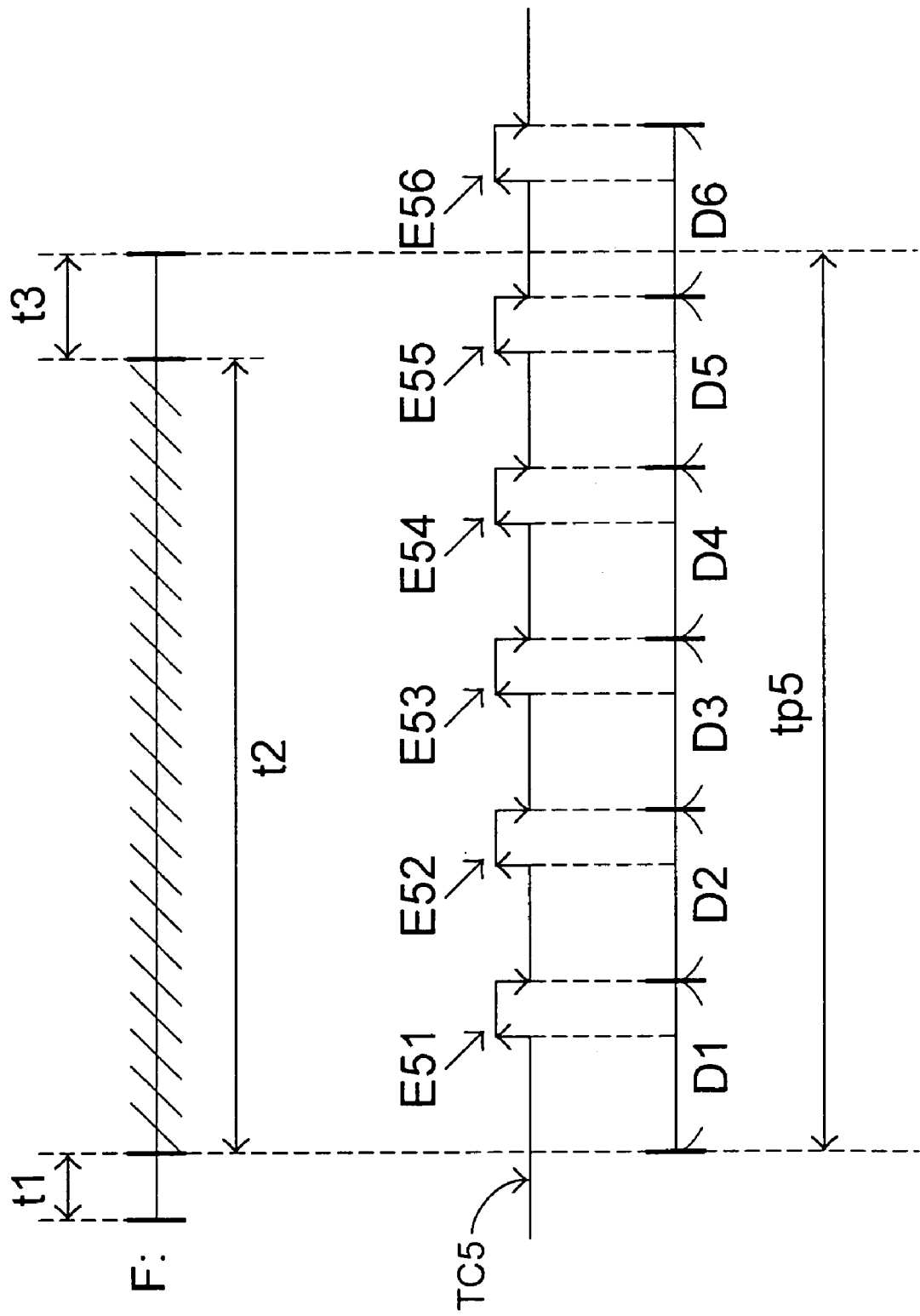
FIG. 6 is a timing waveform diagram illustrating the related signals processed in the network transmission system of FIG. 1(a) according to a fourth embodiment of the present invention.

Of course, for the still image mode where the processing time is not very critical, the processing time of the image processor 22 for the image frame F can be extended beyond the idle period t3 of the image sensor 21. In other words, the sum of the delay periods E51, E52, E53, E54, E55 and E56 in response to the control signal TC5, as shown in FIG. 6, can be greater than the idle period t3, if necessary.

To sum up, after an initial signal is asserted for outputting the image frame to be processed after the exposure period, a control signal which toggles between first and second states is asserted according to a certain rule mentioned above. The image data segments are thus outputted to the image processor segment by segment in response to the first state of the control signal. Moreover, the output of the image data segments becomes paused whenever the control signal toggles from the first state to the second state. The output of the image data segments can be restored only when the control signal toggles from the second state back to the first second state. In this way, the data overrun problem can be minimized.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image frame transmission method, performed by a network transmission system comprising an image sensor and an image processor, said method comprising steps of:

said image sensor outputting a first image data segment of an image frame captured by said image sensor to said image processor in response to a first state of a control signal issued by said image processor;

said image processor switching said control signal from said first state to a second state to suspend the output of a second image data segment of said image frame, which is previously captured by said image sensor following said first image data segment, from said image sensor to said image processor if said image processor has not completed processing said first image data segment before the output of said second image data segment from said image sensor, and otherwise remaining said control signal in said first state to have said second image data segment outputted from said image sensor to said image processor immediately following said first image data segment without suspension; and said image sensor outputting said second image data segment to said image processor in response to the transition of said control signal from said second state to said first state;

wherein a processing period of said image sensor for said image frame is pre-defined with an exposure period for capturing a plurality of image data segments including said first and second image data segments of said image frame, an image data outputting period for continuously outputting said plurality of image data segments of said image frame, and an idle period for waiting to process a next image frame in sequence; and said plurality of image data segments share said idle period to elongate an image data processing period in which said image frame is completely outputted to said image processor with necessary suspension, to beyond said image data outputting period.

2. The method according to claim 1 wherein said image data processing period is greater than said image data outputting period.

3. The method according to claim 1 wherein said image data processing period is greater than said image data outputting period but not greater than the sum of said image data outputting period and said idle period.

4. The method according to claim 1 wherein said image data processing period is equal to the sum of said image data outputting period and said idle period.

5. The method according to claim 1 wherein said plurality of image data segments share said idle period to elongate said image data processing period by toggling said control signal between said first and second states according to respective conditions of said plurality of image data segments.

6. The method according to claim 1 wherein said first and second states of said control signal are high and low levels.

7. The method according to claim 1 wherein said image sensor is operated in a still image mode.

8. The method according to claim 1 wherein said image sensor is operated in a dynamic image mode.

9. An image frame transmission method, performed by a network transmission system comprising an image sensor and an image processor, a processing period of said image sensor for an image frame being pre-defined with an exposure period for capturing a plurality of image data segments of said image frame, an image data outputting period for continuously outputting said plurality of image data segments of said image frame, and an idle period for waiting to process next image frame in sequence, and said method comprising steps of:

said image processor asserting an initial signal for outputting said image frame within an image data processing period after said exposure period;

said image processor issuing a control signal which periodically toggles between first and second states so that said plurality of image data segments equally share said idle period to elongate said image data processing period to beyond said image data outputting period;

said image sensor outputting said plurality of image data segments to said image processor segment by segment in response to said first state of said control signal;

said image sensor suspending the output of said plurality of image data segments whenever said control signal toggles from said first state to said second state; and said image sensor restoring the output of said plurality of image data segments in response to the transition of said control signal from said second state to said first second state.

10. The method according to claim 9 wherein said image data processing period is greater than said image data outputting period but not greater than the sum of said image data outputting period and said idle period.

11. The method according to claim 9 wherein said image data processing period is equal to the sum of said image data outputting period and said idle period.

12. The method according to claim 9 wherein said image sensor is operated in a still image mode.

13. The method according to claim 9 wherein said image sensor is operated in a dynamic image mode.

* * * * *